United States Patent [19]
Nakazawa et al.

[11] Patent Number: 5,772,289
[45] Date of Patent: Jun. 30, 1998

[54] VEHICLE BRAKING FORCE CONTROLLER

[75] Inventors: Masao Nakazawa; Osamu Isobe; Sadahiro Takahashi; Ikurou Notsu, all of Ageo, Japan

[73] Assignee: Nissan Diesel Co., Ltd., Ageo, Japan

[21] Appl. No.: 521,536

[22] Filed: Aug. 30, 1995

[30] Foreign Application Priority Data

| Oct. 11, 1994 | [JP] | Japan | 6-245389 |
| Oct. 14, 1994 | [JP] | Japan | 6-249380 |
| Nov. 28, 1994 | [JP] | Japan | 6-293106 |

[51] Int. Cl.$^6$ ............................................. B60T 8/18
[52] U.S. Cl. ..................... 303/9.69; 303/198; 303/146
[58] Field of Search ............................. 303/9.69, 123, 303/146, 147, 181–183, 198, 155, 191, 22.1, 22.2; 364/462.02, 463, 426.024, 426.026; 188/195

[56] References Cited

U.S. PATENT DOCUMENTS

| 4,414,630 | 11/1983 | Harris et al. | 303/198 X |
| 4,677,557 | 6/1987 | Stumpe | 303/9.69 X |
| 4,795,219 | 1/1989 | Brearley et al. | 303/9.69 |
| 4,833,469 | 5/1989 | David . | |
| 5,166,881 | 11/1992 | Akasu . | |
| 5,355,118 | 10/1994 | Fukuhara . | |
| 5,420,792 | 5/1995 | Butsuen et al. . | |
| 5,459,460 | 10/1995 | Nishino . | |
| 5,474,369 | 12/1995 | Inagaki et al. | 303/146 |
| 5,505,532 | 4/1996 | Tozu et al. | 303/198 |

*Primary Examiner*—Josie Ballato
*Attorney, Agent, or Firm*—Foley & Lardner

[57] ABSTRACT

In an apparatus for controlling the braking force applied to the wheels of a vehicle, the braking force required for the vehicle is calculated according to a brake pedal depression amount and the weight of the vehicle. This braking force is allocated to the wheels, according to static loads acting on the wheels which vary according to the vehicle loading conditions. Alternatively, the forward/backward acceleration of the vehicle and sideway acceleration of the front and rear axles are detected, dynamic loads acting on the wheels are calculated from the static loads and these accelerations, and the braking force is allocated according to these dynamic loads. Preferably, the roll angles of the front and rear axles are respectively detected, and the detected sideways accelerations are corrected based on these angles. By way of this braking force control, braking force can be optimized according to the loading conditions in commercial vehicles, such as trucks, where wheel load conditions largely vary.

9 Claims, 6 Drawing Sheets $Gx_l = Gx \cdot \cos\phi p$
$g_l = g \cdot \sin\phi p$
$Gx_0 = (a) + (b)$

VEHICLE BRAKING FORCE CONTROLLER

FIELD OF THE INVENTION

This invention relates to a system for distributing a braking force of a vehicle such as a truck according to wheel load.

BACKGROUND OF THE INVENTION

In recent years, advances in electronic control have led to higher vehicle performance, and in the field of braking control, anti-skid brake system and traction control, for example, are now being applied.

Wheel Load Proportional Yaw Rate Feedback Braking Force Distribution Control with a Control-by-Wire Brake System published by Inagaki et al. in the Honda R&D Technical Review, Vol. 5, 1993, also relates to electronic control of braking force.

In this system, braking action while the vehicle is moving is optimized by arranging the brake pressure applied to the wheels, which is directly proportional to the dynamic load the wheels are bearing. This is used in conjunction with a control-by-wire system wherein the braking pressure applied to the wheels is controlled independently and freely.

First, a target vehicle deceleration relative to a brake depression amount is set, and multiplied by the vehicle weight to give the required vehicle braking force. The dynamic load on the wheels is then calculated from the static load acting on the wheels and the load displacement due to forward/backward and sideway acceleration, and the vehicle braking force is distributed over the wheels with a distribution factor depending on the dynamic load. The braking force applied to the wheels varies according to the load displacement between the wheels due to braking or turning, and efficient braking can therefore be performed.

This system is designed for passenger vehicles with small load variations and short wheel bases, so the static load on the wheels is first given as a fixed value to a control unit. The acceleration of the vehicle is represented by a value measured in the vicinity of the center of gravity.

However, in the case of large vehicles such as trucks, the weight of the chassis largely varies according to the amount of goods carried, and the load balance on the wheels largely varies according to the position of the goods. Further, as the wheel base is long, the sideway acceleration of the front axle and the sideway acceleration of the rear axle are different. This braking force control system was therefore not very practical in the case of large vehicles.

Further, as the acceleration sensor detects sideways or forward/backward acceleration, the detected acceleration contains an acceleration component due to gravity when the vehicle leans. Therefore, when the vehicle leans the precision of detecting acceleration is less, and as a result, the error in distributing braking force increases.

SUMMARY OF THE INVENTION

It is therefore an object of this invention to obtain braking characteristics suited to variations in a loading amount and position of goods carried by vehicles.

It is a further object of this invention to eliminate the error caused by acceleration due to gravity from the value detected by an acceleration sensor.

In order to achieve the above objects, this invention provides a braking force controller for a vehicle with a front axle, and a rear axle each of which supports wheels. The controller comprises a brake pedal, a mechanism for detecting a depression amount of the brake pedal, a mechanism for setting a static load on each of the wheels, a mechanism for computing a target vehicle deceleration from a sum of the static loads on the wheels and the depression amount, a mechanism for calculating a vehicle braking force required to obtain the target deceleration, a mechanism for allocating the vehicle braking force to each of the wheels based on the static load on each of the wheels, and a mechanism for respectively applying a braking force allocated by the allocating mechanism to each of the wheels.

The static load setting mechanism preferably comprises a sensor for detecting a static load acting on each of the wheels.

The static load setting mechanism may alternatively comprise a mechanism for inputting a vehicle loading condition and a mechanism for setting the static load on each of the wheels according to this condition.

According to another aspect of this invention, the controller comprises a brake pedal, a mechanism for detecting a depression amount of the break pedal, a mechanism for setting a static load on each of the front and rear wheels, a mechanism for computing a target vehicle deceleration from a sum of the static loads on the front and rear wheels and the depression amount, a mechanism for calculating a vehicle braking force required to obtain the target deceleration, a mechanism for detecting a sideway acceleration of the front axle, a mechanism for detecting a sideway acceleration of the rear axle, a mechanism for calculating a dynamic load on each of the front wheels from the static load on each of the front wheels and the sideway acceleration of the front axle, a mechanism for calculating a dynamic load on each of the rear wheels from the static load on each of the rear wheels and the sideways acceleration of the rear axle, a mechanism for allocating the vehicle braking force to each of the front and rear wheels based on the dynamic load on each of the front and rear wheels, and a mechanism for respectively applying a braking force allocated by the allocating mechanism to each of the front and rear wheels.

The static load setting mechanism preferably comprises a sensor for detecting a static load acting on each of the front and rear wheels.

The static load setting mechanism may alternatively comprise a mechanism for inputting a vehicle loading condition and a mechanism for setting the static load on each of the front and rear wheels according to this condition.

According to yet another aspect of this invention, the controller comprises a brake pedal, a mechanism for detecting a depression amount of the brake pedal, a mechanism for setting a static load on each of the front and rear wheels, a mechanism for computing a target vehicle deceleration from a sum of the static loads on the front and rear wheels and the depression amount, a mechanism for calculating a vehicle braking force required to obtain the target deceleration, a mechanism for detecting a sideway acceleration of the front axle, a mechanism for detecting a sideway acceleration of the rear axle, a mechanism for detecting a roll angle of the front axle, a mechanism for detecting a roll angle of the rear axle, a mechanism for correcting the sideway acceleration of the front axle according to the roll angle of the front axle, a mechanism for correcting the sideway acceleration of the rear axle according to the roll angle of the rear axle, a mechanism for calculating a dynamic load on each of the front wheels from the static load on each of the front wheels and a corrected sideway acceleration of the front axle corrected by the front axle sideway acceleration correcting mechanism, a mechanism for calculating a dynamic load on each of the rear wheels from the static load on each of the rear wheels and a corrected sideway acceleration of the rear axle corrected by the rear axle sideway acceleration correcting mechanism, a mechanism for allocating the vehicle braking force to each of the front and rear wheels based on the dynamic load on each of the front and rear wheels, and a mechanism for respectively applying a braking force allocated by the allocating mechanism to each of the front and rear wheels.

Preferably, the front axle roll angle detecting mechanism comprises a mechanism for detecting a contraction amount of a suspension that supports each of the front wheels on the front axle, and the rear axle roll angle detecting mechanism comprises a mechanism for detecting a contraction amount of a suspension that supports each of the rear wheels on the rear axle.

According to yet another aspect of this invention, the controller comprises a brake pedal, a mechanism for detecting a depression amount of the brake pedal, a mechanism for setting a static load on each of the front and rear wheels, a mechanism for computing a target vehicle deceleration from a sum of the static loads on the front and rear wheels and the depression amount, a mechanism for calculating a vehicle braking force required to obtain the target deceleration, a mechanism for detecting a forward/backward acceleration of the vehicle, a mechanism for detecting a sideway acceleration of the front axle, a mechanism for detecting a sideway acceleration of the rear axle, a mechanism for detecting a pitch angle of the vehicle, a mechanism for detecting a roll angle of the front axle, a mechanism for detecting a roll angle of the rear axle, a mechanism for correcting the forward/backward acceleration according to the pitch angle, a mechanism for correcting the sideway acceleration of the front axle according to the roll angle of the front axle, a mechanism for correcting the sideway acceleration of the rear axle according to the roll angle of the rear axle, a mechanism for calculating a dynamic load on each of the front wheels from the static load on each of the front wheels, a corrected forward/backward acceleration corrected by the forward/backward acceleration correcting mechanism, and a corrected sideway acceleration of the front axle corrected by the front axle sideway acceleration correcting mechanism, a mechanism for calculating a dynamic load on each of the rear wheels from the static load on each of the rear wheels, the corrected forward/backward acceleration, and a corrected sideway acceleration of the rear axle corrected by the rear axle sideway acceleration correcting mechanism, a mechanism for allocating the vehicle braking force to each of the front and rear wheels based on the dynamic load on each of the front and rear wheels, and a mechanism for respectively applying a braking force allocated by the allocating mechanism to each of the front and rear wheels.

The details as well as other features and advantages of this invention are set forth in the remainder of the specification and are shown in the accompanying drawings.

DESCRIPTION OF THE PREFERRED EMBODIMENTS

Figure 1:
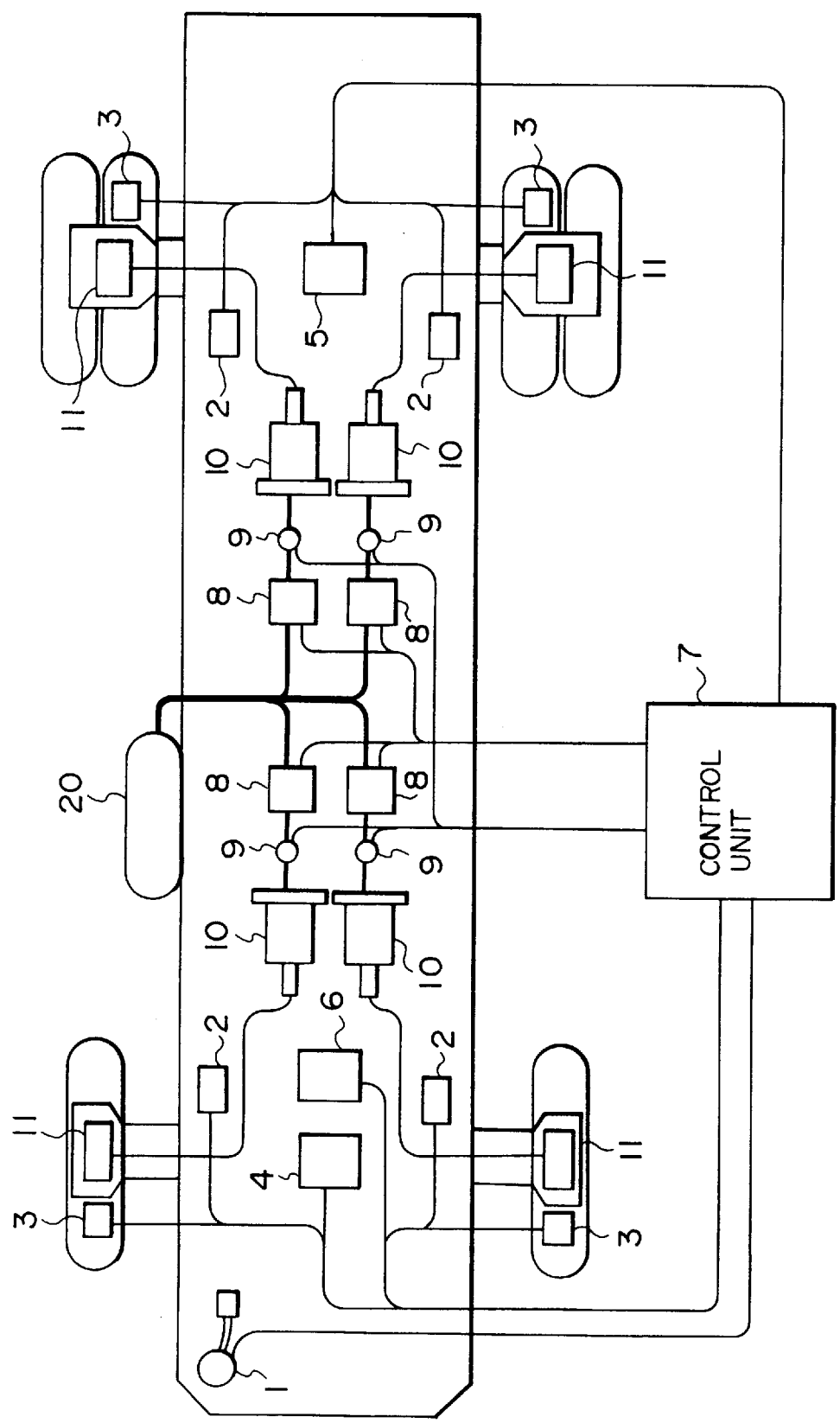
FIG. 1 is a schematic diagram of a braking force controller according to this invention.

Referring to FIG. 1 of the drawings, a wheel cylinder 11 is provided on each wheel of a truck, which cylinder brakes the wheel when it receives a hydraulic pressure. A booster 10 is connected to each of the cylinders 11 by a hydraulic pipe. The booster 10 is connected to an air reservoir 20 via an electromagnetic valve 8. A hydraulic pressure proportional to an input air pressure is thereby supplied to the wheel cylinder 11.

The electromagnetic valve 8 controls the air pressure supplied to the booster 10 from the air reservoir 20 according to a command current input from a control unit 7.

Signals from stroke sensors 2, acceleration sensors 4, 5 and 6, brake depression amount sensor 1, tire rotation sensors 3, and brake air pressure sensors 9 are input to the control unit 7.

The stroke sensors 2 detect a contraction amount of a suspension supporting the right front wheel, left front wheel, right rear wheel and left rear wheel, and are fitted to each wheel. The stroke sensors 2 also function for detecting a static load applied to the wheels from the contraction amount. The acceleration sensor 6 detects the forward/backward acceleration. The acceleration sensor 4 detects the sideway acceleration of the front axle of the vehicle, and the acceleration sensor 5 detects the sideway acceleration of the rear axle of the vehicle.

The brake pedal depression amount sensor 1 detects a depression amount of a vehicle brake pedal. The tire rotation sensors 3 detect the rotation speed of the wheels. The brake air pressure sensors 9 detect the air pressure downstream of the electromagnetic valves 8 and boosters 10.

Figure 2:
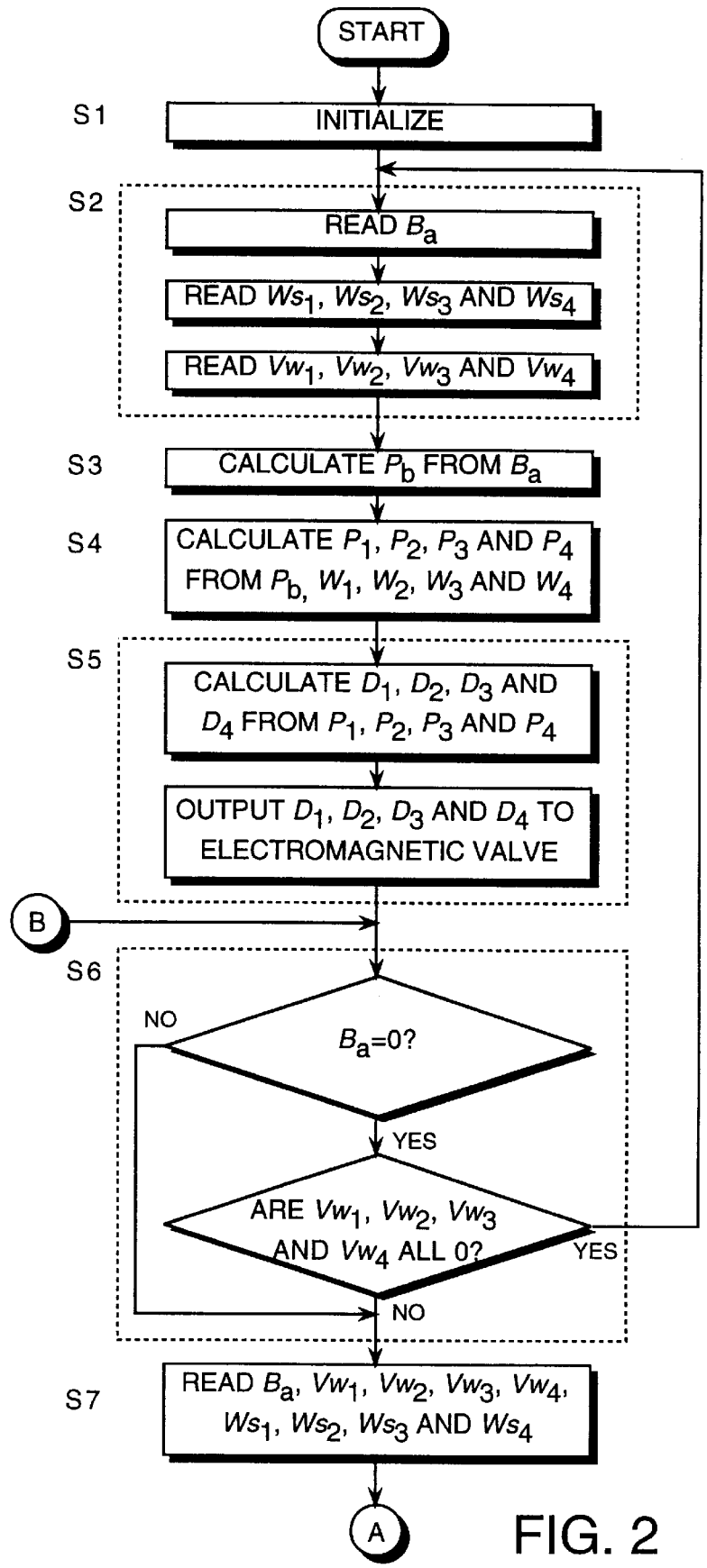
FIG. 2 is a flowchart showing a braking force control process according to this invention.
Figure 3:
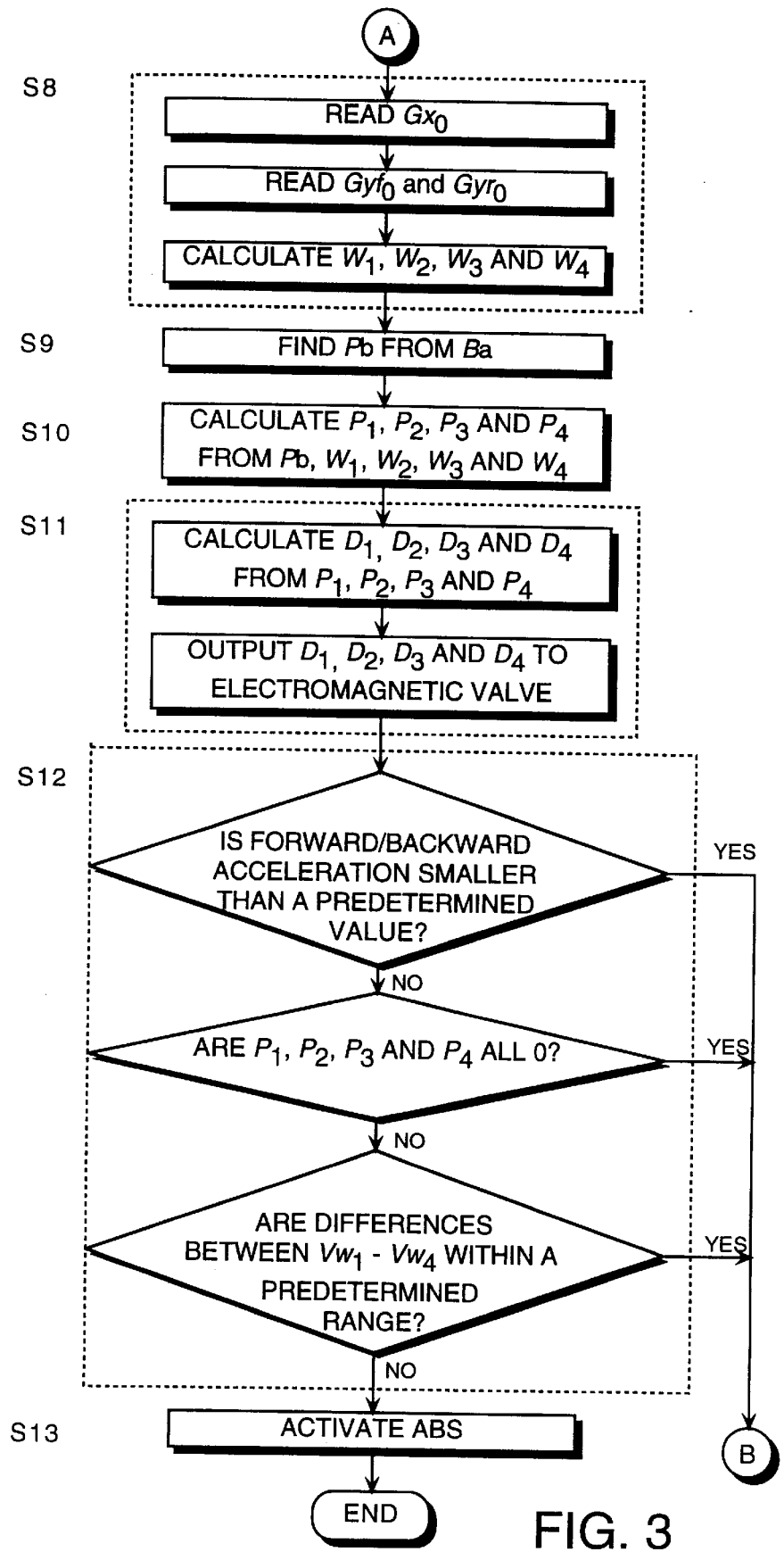
FIG. 3 is a continuation of the flowchart in FIG. 2.
Figure 4:
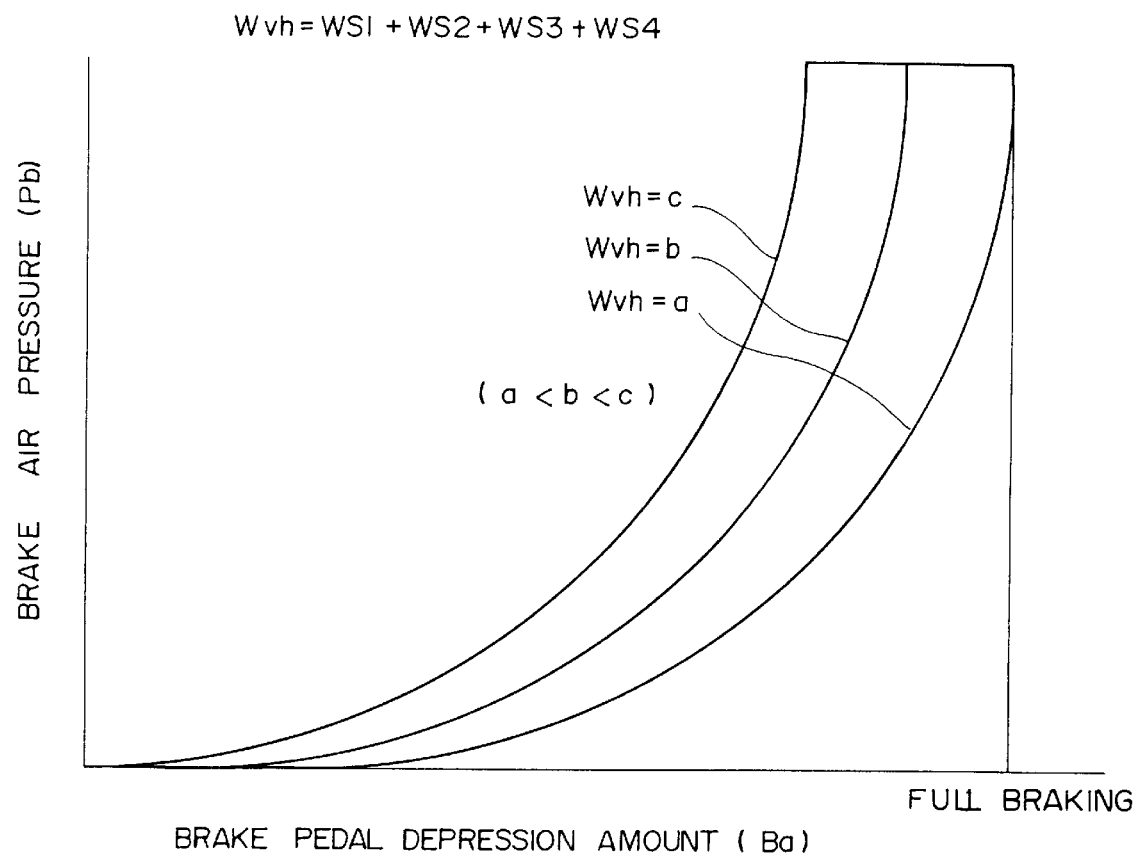
FIG. 4 is a graph showing the contents of a map of brake air pressure characteristics used in the braking force control according to this invention.

The control unit 7 is a microprocessor comprising an I/O circuit, ROM, RAM and CPU, and a map of brake air pressure as shown in FIG. 4 is stored in the ROM. The control unit 7 controls the braking pressure on each wheel in relation to the aforesaid signal input according to the processes shown in FIGS. 2, 3 and 5.

In a step S1, a predetermined initialization is performed on the circuits when the power is switched on by an ignition key of the truck. In a step S2, a brake pedal depression amount $B_a$ is read from a signal output by the brake pedal depression amount sensor 1, static loads $Ws_1$–$Ws_4$ of each wheel are read from the signals output by the stroke sensors 2, and tire rotation speeds $Vw_1$–$Vw_4$ are read from the signals output by the tire rotation sensors 3.

In steps S3 and S4, the static loads are summed, the vehicle weight $Wvh=(Ws_1+Ws_2+Ws_3+Ws_4)$ is calculated, and a brake air pressure $P_b$ required to reach a target deceleration is found by looking up a map in FIG. 4 from the vehicle weight Wvh and brake depression amount $B_a$. The brake air pressure $P_b$ is also distributed between the wheels with a distribution factor depending on the static load $Ws_1$–$Ws_4$ on each wheel, and the brake air pressures $P_1$–$P_4$ for each wheel are calculated.

In a step S5, current command values $D_1$–$D_4$ corresponding to the brake air pressures $P_1$–$P_4$ are calculated, and output to the electromagnetic valve 8.

In a step S6, when the brake pedal depression amount $B_a$ is zero while the tire rotation speeds $Vw_1$–$Vw_4$ are all zero, the processing starts again from the step S1.

When the situation does not correspond to either of these cases, a braking operation is performed while the vehicle is traveling. In this case, the processing from a step S7 onwards is performed.

In the step S7, the brake depression amount $B_a$, static loads $Ws_1$–$Ws_4$ on each wheel and tire rotation speeds $Vw_1$–$Vw_4$ are again read.

In a step S8, the forward/backward acceleration $G_{x_0}$ of the vehicle is read from a signal output by the forward/backward acceleration sensor 6, and sideway accelerations $G_{yf_0}$ of the front axle and $G_{yr_0}$ of the rear axle are respectively read from signals output by the sideway acceleration sensors 4 and, 5. Dynamic loads $W_1$–$W_4$ on each wheel are then calculated from these read values according to a subroutine to be described hereinafter.

In steps S9 and S10, the brake air pressure $P_b$ is found by again looking up the map for the immediately preceding period from the vehicle weight Wvh and brake depression amount $B_a$. The brake air pressure $P_b$ is then distributed between brake air pressures $P_1$–$P_4$ for each wheel with a distribution factor depending on the dynamic loads $W_1$–$W_4$ on the wheels, the corresponding current command values $D_1$–$D_4$ are calculated in a step S11, and these values are output to the electromagnetic valve 8.

In a step S12, it is determined whether or not there is a wheel lock on the brake pressure control. Here, it is determined that the wheels are locked if all of the following three conditions are not satisfied. The forward/backward acceleration does not exceed a predetermined value, the brake air pressures $P_1$–$P_4$ are all zero, and the differences between the tire rotation speeds $Vw_1$–$Vw_4$ are all within a predetermined range. When it is determined that the wheels are locked, an anti-skid brake system (ABS) is activated in a step S13. As such an anti-skid brake system is known in the art, its description will be omitted here.

Figure 5:
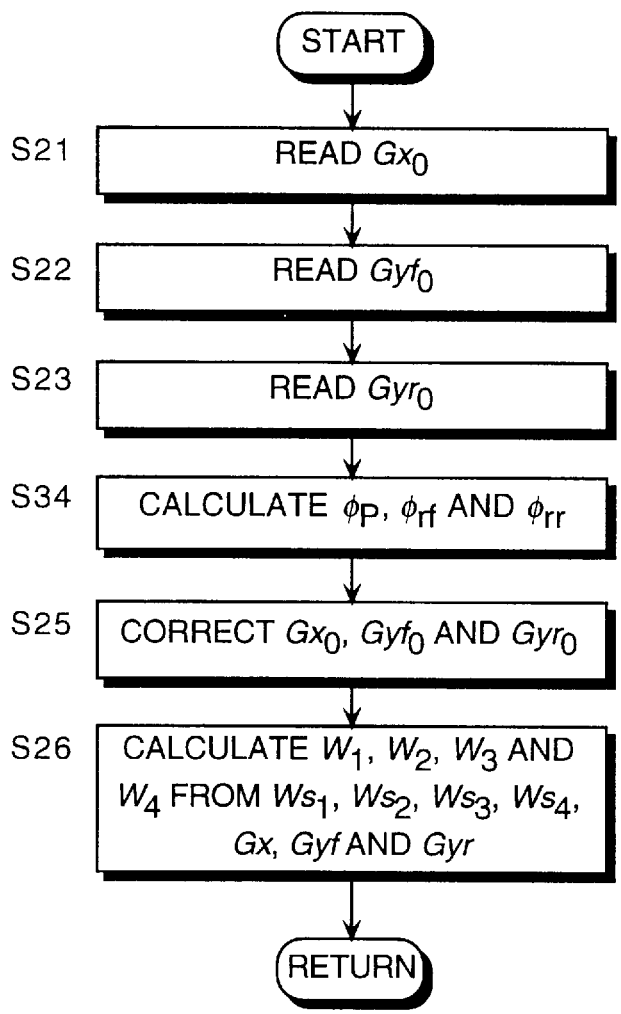
FIG. 5 is a flowchart of a routine for computing dynamic load $W_1$–$W_4$ according to this invention.

Next, the subroutine executed in the step S8 will be described with reference to FIG. 5.

In a step S21, a forward/backward acceleration $G_{x_0}$ is read from a signal output by the forward/backward acceleration sensor 6, in a step S22, a sideway acceleration $G_{yf_0}$ of the front axle is read from the front axle sideway acceleration sensor 4, and in a step S23, a sideway acceleration $G_{yr_0}$ of the rear axle is read from the rear axle sideway acceleration sensor 5.

In a step S24, a vehicle pitch angle $\phi_p$, a front axle roll angle $\phi_{rf}$ and rear axle roll angle $\phi_{rr}$ are calculated from a suspension stroke distance for each wheel.

Figure 6:
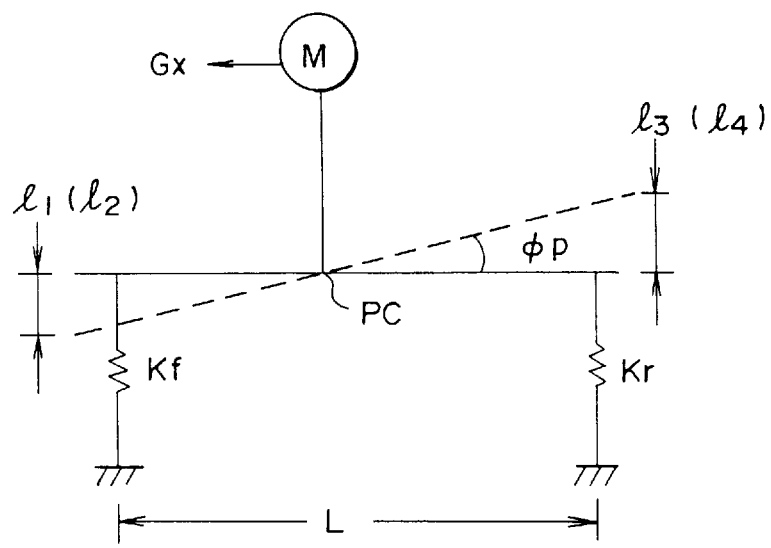
FIG. 6 is a diagram of a numerical model for computing a pitch angle $\phi_p$ according to this invention.

The mathematical model for calculating the vehicle pitch angle $\phi_p$ will now be described with reference to FIG. 6.

As shown in the figure, a mass M on a spring on a pitching center Pc is supported by a front wheel suspension having an elastic constant Kf and a rear wheel suspension having an elastic constant Kr. The wheel base is L. Due to the effect of forward/backward acceleration $G_{x_0}$, a pitch angle $\phi_p$ is generated. If the front and rear axle roll angles at this time are $\phi_{rf}$ and $\phi_{rr}$, the following relation exists.

$$\phi_P = \tan^{-1}\left(\frac{l_1 + l_2 + l_3 + l_4}{2 \cdot L}\right) \quad (1)$$

$$\phi_{rf} = \tan^{-1}\left(\frac{l_1 + l_2}{T_{sf}}\right) \quad (2)$$

$$\phi_{rr} = \tan^{-1}\left(\frac{l_3 + l_4}{T_{sr}}\right) \quad (3)$$

where
$l_1$=stroke distance of front right axle
$l_2$=stroke distance of front left axle
$l_3$=stroke distance of rear right axle
$l_4$=stroke distance of rear left axle
$T_{sf}$=interval of front axle suspension
$T_{sr}$=interval of rear axle suspension In a step S25, the forward/backward acceleration $G_{x_0}$, sideway acceleration $G_{yf_0}$ of the front axle and sideway acceleration $G_{yr_0}$ of the rear axle of the vehicle are corrected for the acceleration component due to gravity applied to each sensor.

Figure 7:
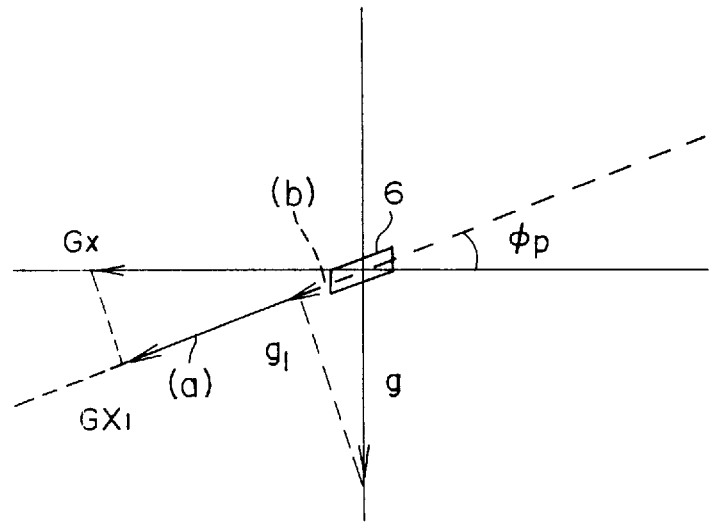
FIG. 7 is a diagram describing the effect of acceleration due to gravity according to this invention.

In other words, as shown in FIG. 7, when for example a pitch angle $\phi_p$ appears, the forward/backward acceleration sensor 6 detects the forward/backward acceleration $G_{x_0}$ when the vehicle is leaning at an angle $\phi_p$. In this case, the following relation holds between the forward/backward acceleration $G_{x_0}$, acceleration g due to gravity and the real forward/backward acceleration $G_x$.

$$G_{x_0} = G_x \cdot \cos\phi_p + g \cdot \sin\phi_p \quad (4)$$

Rewriting equation (4), we have $$G_X = \frac{G_{X_0} - g \cdot \sin\phi_p}{\cos\phi_p} \quad (5)$$

Using these equations, the forward/backward acceleration $G_{x_0}$, is first corrected and the forward/backward acceleration $G_x$ found from the pitch angle $\phi_p$.

Then, by correcting the static loads $Ws_1$–$Ws_4$ based on this forward/backward acceleration $G_x$, the dynamic loads $W_1$–$W_4$ from which the effect of pitching has been eliminated, may be computed.

In the aforesaid description, the effect of pitch angle was taken as an example, however the same description may be given with regard to the effect of the front axle roll angle $\phi_{rf}$ and the rear axle roll angle $\phi_{rr}$.

In this case, due to the front axle roll angle $\phi_{rf}$, the sideway acceleration sensor 4 on the front axle is also inclined to $\phi_{rf}$, when it detects the sideway acceleration $G_{yf_0}$. The following relation therefore holds between this detected value $G_{yf_0}$, the acceleration g due to gravity and the front axle sideway acceleration $G_{yf}$.

$$G_{yf_0} = G_{yf} \cdot \cos\phi_{rf} + g \cdot \sin\phi_{rf} \quad (6)$$

$$G_{yf} = \frac{G_{xf_0} - g \cdot \sin\phi_{rf}}{\cos\phi_{rf}} \quad (7)$$

Similarly, with regard to the roll angle $\phi_{rr}$, the following relation holds.

$$G_{yr_0} = G_{yr} \cdot \cos\phi_{rr} + g \cdot \sin\phi_{rr} \quad (8)$$

$$G_{yr} = \frac{G_{yr_0} - g \cdot \sin\phi_{rr}}{\cos\phi_{rr}} \quad (9)$$

In a step S26, the dynamic loads $W_1$–$W_4$ for each wheel are computed based on the static loads $Ws_1$–$Ws_4$ for each wheel read in the step S7, forward/backward acceleration $G_x$, sideway acceleration $G_{yf}$ of the front axle and sideway acceleration $G_{yr}$ of the rear axle by the equations (10)–(13).

$$W_1 = W_{S1} + \frac{(M_f + M_r) \cdot hg \cdot G_x}{2 \cdot L} + \frac{M_f \cdot hg \cdot G_{yf}}{T_{sf}} \quad (10)$$

$$W_2 = W_{S2} + \frac{(M_f + M_r) \cdot hg \cdot G_x}{2 \cdot L} - \frac{M_f \cdot hg \cdot G_{yf}}{T_{sf}} \quad (11)$$

$$W_3 = W_{S3} - \frac{(M_f + M_r) \cdot hg \cdot G_x}{2 \cdot L} + \frac{M_f \cdot hg \cdot G_{yf}}{T_{sf}} \quad (12)$$

$$W_4 = W_{S4} - \frac{(M_f + M_r) \cdot hg \cdot G_x}{2 \cdot L} - \frac{M_f \cdot hg \cdot G_{yf}}{T_{sf}} \quad (13)$$

where $M_f$=mass on spring of front axle $M_r$=mass on spring of rear axle hg=height of center of gravity The first term of each equation relates to the static load Ws. For the second term, a correction term relating to the forward/backward acceleration $G_x$ is computed by dividing the inertial moment produced by the effect of the forward/backward acceleration $G_x$ by the wheel base. For the third term, a correction term relating to the sideway acceleration $G_{yf}$ or $G_{yr}$ is computed by dividing the inertial moment produced by the effect of the sideway acceleration $G_{yf}$ on the front axle or the sideway acceleration $G_{yr}$ on the rear axle $G_x$ by the suspension interval.

Hence in the case of a commercial vehicle such as a truck, even when the weight of the truck varies largely due to the goods it carries, or when the wheel load balance varies largely due to the position of the goods it carries, the static loads $Ws_1$–$Ws_4$ on each wheel are corrected by the forward/backward acceleration $G_x$ of the vehicle, the sideway acceleration $G_{yf}$ of the front axle and the sideway acceleration $G_{yr}$ of the rear axle so as to compute the dynamic loads $W_1$–$W_4$ on each wheel. Therefore, even if a difference between the sideway acceleration $G_{yf}$ of the front axle and the sideway acceleration $G_{yr}$ of the rear axle occurs due to the long wheel base, a dynamic wheel load can be precisely computed taking account of this difference, and braking characteristics can be obtained which correspond to the variation of loading amount and position.

In other words, due to loading amount and position, the brake air pressure varies for each wheel for the same brake pedal depression amount $B_a$, effective braking can be performed even for trucks with long wheel bases.

The sideway acceleration can be detected individually for the front axle and rear axle, so the effect of variation of loading conditions on the sideways acceleration can be dealt with appropriately. Further, the sideway acceleration and forward/backward acceleration are corrected according to the angle of vehicle rolling and pitching. Errors occurring in the values detected by the acceleration sensors on the front and rear axles 4 and 5 due to tilting of the vehicle are thereby corrected, and the braking force can be distributed even more precisely.

As the left and right suspension intervals $T_{sf}$, $T_{sr}$ are smaller than the front and rear suspension intervals (wheel base) L of the truck, the tilt angle of the vehicle in the roll direction is generally larger than the tilt angle in the pitch direction. This is particularly marked when the vehicle brakes during a turn. According to the aforesaid example, the acceleration was corrected by considering tilt angles in both the roll and pitch directions, however adequate results can still be obtained even if the acceleration is corrected taking account of only the tilt angle in the roll direction which has a larger effect.

As a truck has a large wheel base, the frame may be deformed elastically, and it may thus be considered that the front axle and rear axle have independent roll systems. From this viewpoint, therefore, detecting the accelerations of the front and rear axles separately contributes to maintaining good control precision.

Due to hysteresis as a result of frictional characteristics, the amount of contraction in the suspension when the load is increased is not necessarily the same as the amount of contraction at the same load when the load is decreased. Therefore, if the static loads $Ws_1$–$Ws_4$ on the wheels are detected from the contraction of the suspension as in the case of this example, the values obtained by statistically processing a plurality of values detected in the process of repeating the steps S1–S5 may also be used for the static loads $Ws_1$–$Ws_4$ in order to increase the accuracy of the control.

Further, instead of detecting the static loads $Ws_1$–$Ws_4$ by physical means such as sensors, static load data for each wheel according to conditions such as loading amount and position may first be stored in the control unit 7, and the static load on each wheel is set by the control unit 7 when these loading conditions are manually input by a driver of the truck when the vehicle starts traveling.

The embodiments of this invention in which an exclusive property or privilege is claimed are defined as follows:

1. A braking force controller for a vehicle, said vehicle having a front axle and a rear axle each of which supports wheels, comprising:

a brake pedal, means for detecting a depression amount of said brake pedal, means for setting a static load on each of said wheels, means for computing a target vehicle deceleration from a sum of said static loads on said wheels and said depression amount, means for calculating a vehicle braking force required to obtain said target deceleration, means for allocating said vehicle braking force to each of said wheels based on said static load on each of said wheels, and means for respectively applying a braking force allocated by said allocating means to each of said wheels.

2. A braking force controller as defined in claim 1, wherein said static load setting means comprises sensor means for detecting a static load acting on each of said wheels.

3. A braking force controller as defined in claim 1, wherein said static load setting means comprises means for inputting a vehicle loading condition and means for setting said static load on each of said wheels according to said condition.

4. A braking force controller for a vehicle, said vehicle having a front axle that supports front wheels and a rear axle each that supports rear wheels, comprising:

a brake pedal, means for detecting a depression amount of said brake pedal, means for setting a static load on each of said front and rear wheels, means for computing a target vehicle deceleration from a sum of said static loads on said front and rear wheels and said depression amount, means for calculating a vehicle braking force required to obtain said target deceleration, means for detecting a sideway acceleration of said front axle, means for detecting a sideway acceleration of said rear axle, means for calculating a dynamic load on each of said front wheels from said static load on each of said front wheels and the sideway acceleration of said front axle, means for calculating a dynamic load on each of said rear wheels from said static load on each of said rear wheels and the sideway acceleration of said rear axle, means for allocating said vehicle braking force to each of said front and rear wheels based on said dynamic load on each of said front and rear wheels, and means for respectively applying a braking force allocated by said allocating means to each of said front and rear wheels.

5. A braking force controller as defined in claim 4, wherein said static load setting means comprises sensor means for detecting a static load acting on each of said front and rear wheels.

6. A braking force controller as defined in claim 4, wherein said static load setting means comprises means for inputting a vehicle loading condition and means for setting said static load on each of said front and rear wheels according to said loading condition.

7. A braking force controller for a vehicle, said vehicle having a front axle that supports front wheels and a brake pedal, and a rear axle that supports rear wheels and a brake pedal, comprising:

means for detecting a depression amount of said brake pedal, means for setting a static load on each of said front and rear wheels, means for computing a target vehicle deceleration from a sum of said static loads on said front and rear wheels and said depression amount, means for calculating a vehicle braking force required to obtain said target deceleration, means for detecting a sideway acceleration of said front axle, means for detecting a sideway acceleration of said rear axle, means for detecting a roll angle of said front axle, means for detecting a roll angle of said rear axle, means for correcting said sideway acceleration of said front axle according to said roll angle of said front axle, means for correcting said sideway acceleration of said rear axle according to said roll angle of said rear axle, means for calculating a dynamic load on each of said front wheels from said static load on each of said front wheels and a corrected sideway acceleration of said front axle corrected by said front axle sideway acceleration correcting means, means for calculating a dynamic load on each of said rear wheels from said static load on each of said rear wheels and a corrected sideway acceleration of said rear axle corrected by said rear axle sideway acceleration correcting means, means for allocating said vehicle braking force to each of said front and rear wheels based on said dynamic load on each of said front and rear wheels, and means for respectively applying a braking force allocated by said allocating means to each of said front and rear wheels.

8. A braking force controller as defined in claim 7, wherein said front axle roll angle detecting means comprises means for detecting a contraction amount of a suspension that supports each of said front wheels on said front axle, and said rear axle roll angle detecting means comprises means for detecting a contraction amount of a suspension that supports each of said rear wheels on said rear axle.

9. A braking force controller for a vehicle, said vehicle having a front axle that supports front wheels and a rear axle that supports rear wheels and a brake pedal, comprising:

means for detecting a depression amount of said brake pedal, means for setting a static load on each of said front and rear wheels, means for computing a target vehicle deceleration from a sum of said static loads on said front and rear wheels and said depression amount, means for calculating a vehicle braking force required to obtain said target deceleration, means for detecting a forward/backward acceleration of said vehicle, means for detecting a sideway acceleration of said front axle, means for detecting a sideway acceleration of said rear axle, means for detecting a pitch angle of said vehicle, means for detecting a roll angle of said front axle, means for detecting a roll angle of said rear axle, means for correcting said forward/backward acceleration according to said pitch angle, means for correcting said sideway acceleration of said front axle according to said roll angle of said front axle, means for correcting said sideway acceleration of said rear axle according to said roll angle of said rear axle, means for calculating a dynamic load on each of said front wheels from said static load on each of said front wheels, a corrected forward/backward acceleration corrected by said forward/backward acceleration correcting means, and a corrected sideway acceleration of said front axle corrected by said front axle sideway acceleration correcting means, means for calculating a dynamic load on each of said rear wheels from said static load on each of said rear wheels, said corrected forward/backward acceleration, and a corrected sideway acceleration of said rear axle corrected by said rear axle sideway acceleration correcting means, means for allocating said vehicle braking force to each of said front and rear wheels based on said dynamic load on each of said front and rear wheels, and means for respectively applying a braking force allocated by said allocating means to each of said front and rear wheels.

* * * * *